(12) United States Patent
Oono

(10) Patent No.: US 10,705,703 B2
(45) Date of Patent: Jul. 7, 2020

(54) CONTROLLING ELECTRONIC DEVICES BY OPERATING HEAD MOUNTED DISPLAY

(71) Applicant: Universal Entertainment Corporation, Tokyo (JP)

(72) Inventor: Hiroshi Oono, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 201 days.

(21) Appl. No.: 15/404,162

(22) Filed: Jan. 11, 2017

(65) Prior Publication Data

US 2018/0196592 A1 Jul. 12, 2018

(51) Int. Cl.

| G06F 17/00 | (2019.01) |
|---|---|
| G06F 3/0484 | (2013.01) |
| F25D 29/00 | (2006.01) |
| G06F 3/01 | (2006.01) |
| G06F 3/0481 | (2013.01) |

(52) U.S. Cl.
CPC ......... G06F 3/04847 (2013.01); F25D 29/00 (2013.01); *F25D 2400/361* (2013.01); *G06F 3/012* (2013.01); *G06F 3/04815* (2013.01)

(58) Field of Classification Search
None
See application file for complete search history.

(56) References Cited

U.S. PATENT DOCUMENTS

| 2007/0098351 A1* | 5/2007 | East ................. H04H 20/33 |
| | | 386/262 |
| 2008/0080593 A1* | 4/2008 | Lane ................. G01K 13/002 |
| | | 374/208 |
| 2012/0019378 A1* | 1/2012 | Watson ............. H04L 12/2825 |
| | | 340/539.1 |
| 2013/0069985 A1* | 3/2013 | Wong ................ G02B 27/017 |
| | | 345/633 |
| 2013/0207963 A1* | 8/2013 | Stirbu .................. G06F 3/011 |
| | | 345/419 |
| 2015/0170503 A1* | 6/2015 | Wedig .................. G08B 7/066 |
| | | 340/691.5 |
| 2018/0147483 A1* | 5/2018 | Osman ................. A63F 13/00 |
| 2019/0333361 A1* | 10/2019 | Gullander ........... G06T 11/00 |

* cited by examiner

*Primary Examiner* — Mustafa A Amin
(74) *Attorney, Agent, or Firm* — Polsinelli PC

(57) ABSTRACT

An immersive head-mounted display (IHMD) system includes an IHMD that is communicatively coupled to a control device. The IHMD includes a hardware data receiving component operable to receive data indicative of data generated by the one or more electronic appliances from the control device. The IHMD includes a processing unit further operative to: modify, based on selection of one or more electronic appliances, the graphical user interface to display modifiable settings of the selected one or more electronic appliances; update the modified graphical user interface based on requested changes to the modifiable settings; and transmit, via a hardware transmitting component to the control device, setting data to the selected electronic appliance, wherein the setting data is data obtained from the modified settings.

20 Claims, 12 Drawing Sheets

CONTROLLING ELECTRONIC DEVICES BY OPERATING HEAD MOUNTED DISPLAY

FIELD

The present application is directed to immersive head-mounted displays that are operable to present graphical information to a user.

BACKGROUND

A head-mounted display (HMD) is a display device that is worn on the head of a user. The HMD can be operable to have either a unitary display or two separate displays, that is one display for each eye. The HMD display can be arranged to allow light into the field of vision of the view. In at least one example, the HMD can be an immersive HMD (IHMD). An IHMD is operable to prevent light outside of the IHMD from entering into the field of view. The amount of light that is prevented from entering into the field of view can be dependent upon the fit of the IHMD against the user's face. In at least one example, the IHMD includes a gasket like interface that is designed to contact the user's face.

The IHMD can be configured to display primary content to a user. The primary content can include one or more of virtual reality data, augmented reality data, computer animation data, video data, movie data, or game data.

BRIEF DESCRIPTION OF THE DRAWINGS

Implementations of the present technology will now be described, by way of example only, with reference to the attached figures.

DETAILED DESCRIPTION

Figure 1:
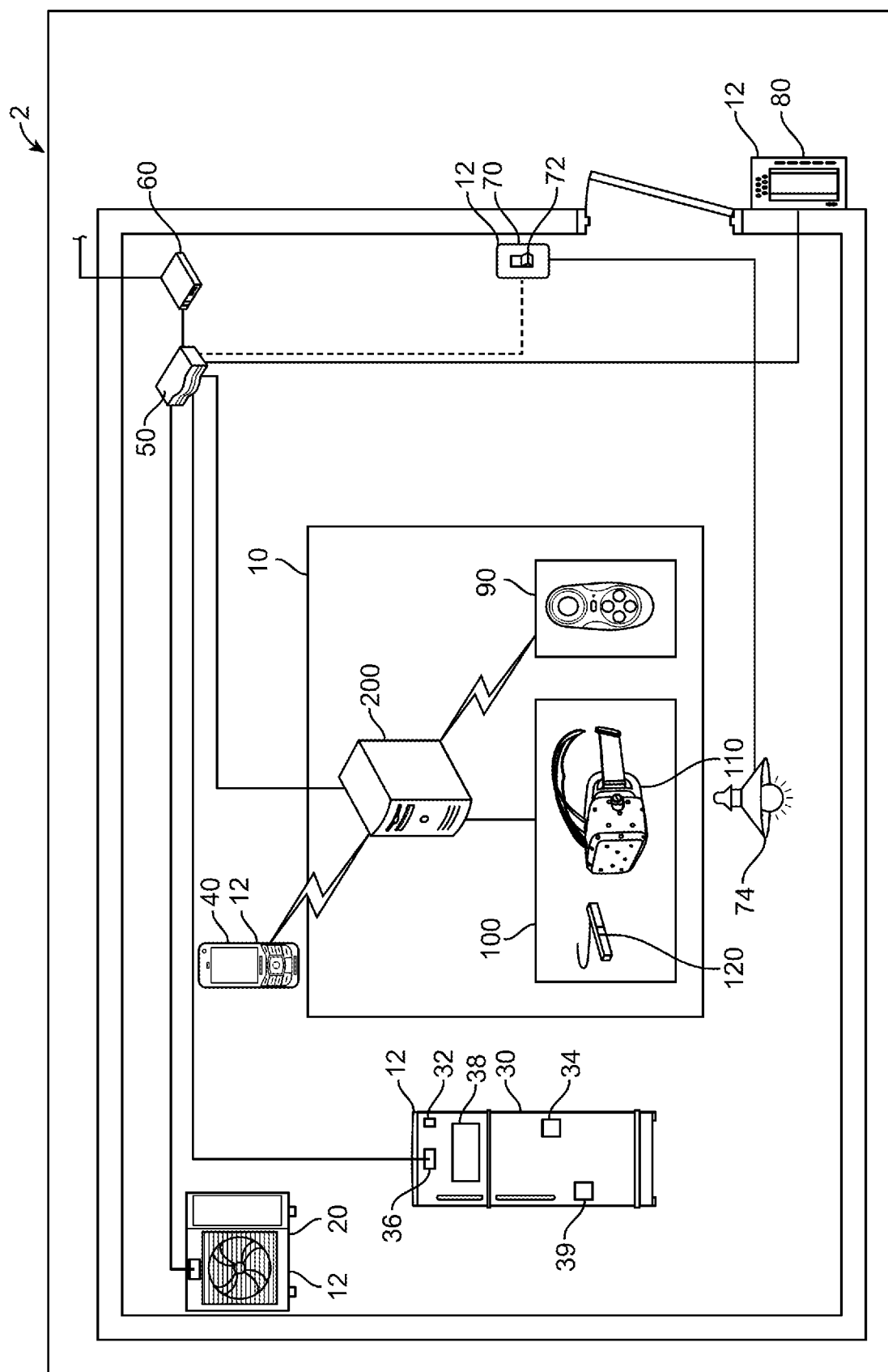
FIG. 1 illustrates an example of a system in which an IHMD is operable.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "electronic appliance" is defined as any electronic device, household or commercial, that can be communicatively coupled to one or more systems. For example, an electronic appliance can be an air conditioning system, heating system, oven, a stove top, a refrigerator, a garage door opener, a gate opener, a light switch or lighting system, a smart phone, a tablet computer, a lock box, a gun safe, a doorway sensor, a motion sensor, or any other communicatively couplable electronic device.

The term "refrigerator" can refer to an electronic appliance capable of store and cooling food. A refrigerator can refer a common appliance having both a cold storage portion, and a frozen storage portion. The term refrigerator can also refer to an appliance having only a cold storage portion or only a frozen storage portion. The term "smartphone" can refer to a handheld electronic device configured to send and/or receive data. The data can be sent over a Wi-Fi or cellular network. The smartphone can send and/or receive data relating to telephone calls, short message service (SMS) messages, electronic messages, electronic mail (e-mail), one or more applications, including games and web browsers. The term "air conditioner" can refer to an electronic appliance capable of cooling a building, home, or other space. The air conditioner can include a cooling coil, an air movement fan, and a thermostat. In at least one example, the air conditioner can be configured as a heat pump to heat a space. The term "graphical user interface" means visual data provided to the user. The graphical user interface can provide a game, a movie, a menu, or other visual data.

The present disclosure describes an immersive head-mounted display (IHMD) and IHMD system. The IHMD system is operable to allow the IHMD to communicate with one or more external devices. In other examples, the IHMD itself can be operable to communicate directly with one or more external devices. The IHMD is operable to receive data from one or more remote systems and further operable to receive data and/or input from at least a controller in response to the one or more remote systems. In other examples, the controller can be integrated into the IHMD.

The IHMD system can include a control device communicatively coupled to one or more external devices. The external devices can be electronic appliances, or more specifically household electronic devices such as a refrigerator, a smart phone, an air conditioner unit, a heater, a stove, a dishwasher, or the like. The IHMD can similarly be communicatively coupled to the control device. The control device can send and/or receive data between the IHMD, the IHMD system, and the one or more external devices. The IHMD can include a hardware data receiving component operable to receive data generated by the one or more external devices from the control device. The IHMD can also include a processing unit having one or more processors communicatively coupled to the hardware data receiving component, and a display device coupled to the processing unit so as to generate a graphical user interface featuring primary content and external device content. The external device content can identify the one or more external devices and provides one or more control elements associated therewith. The external device content can include settings, alerts, or other notifications related to the one more or more external devices.

The processing unit can modify the graphical user interface to display modifiable settings of a selected external device and update the modified graphical user interface based on requested changes to the modifiable settings. The processing unit can also transmit setting data obtained from the modified settings to the selected external device from a hardware transmitting component to the control device.

In some instances, the control device can communicatively couple with an input device configured to select the one or more external devices, settings, or alerts. The input device can be a user manipulated device, such as a motion sensing controller detecting user movements as inputs. The input device can also be one or more retinal cameras monitoring a user's eye movements.

The IHMD system can provide a user an IHMD having a display device presenting a graphical user interface featuring primary content and external device content. The display device can be communicatively coupled to a control device and the control device can also be communicatively coupled with one or more external devices. The user can select and modify settings of the external devices displayed within the display device. A processing unit having one or more processors communicatively coupled with the control device can modify the graphical user interface and update the modified graphical user interface based on the request changes and transmit the setting data to the external device via the control device.

The IHMD system can communicatively couple, directly or through an intervening control device, with one or more electronic appliances such that an IHMD display can provide content received from the one or more electronic appliances and allow the IHMD system to modify or respond to the one or more electronic appliances in view of the received content. In some instances, the received content can be an incoming phone call from a smartphone and providing options to answer the phone call or ignore the phone call. In other instances, the received content can be an alert a refrigerator door is open. The IHMD system can couple with one or more controllers providing input to the IHMD system to generate a modification or response to the one or more electronic appliances.

An IHMD system method can utilize the elements as described above and implemented collectively to form the system. The IHMD system can generate a graphical user interface having primary content. The graphical user interface can be generated by a control device, either separate from the IHMD 100 or integrated therewith, and transmitted to the IHMD. The graphical user interface can include the primary content and electronic appliance content received from the one or more electronic devices coupled to the system.

The IHMD system can display, on an IHMD, the generated graphical user interface. The IHMD system can overlay the electronic appliance content within the graphical user interface displayed within the IHMD. The electronic appliance content can include information relating to one or more electronic appliances. In some instances, the electronic appliance content can be displayed in response to a user input. In other instances, the electronic appliance content can be displayed in response to receiving data from the one or more electronic appliances.

The IHMD system can receive a selection of one or more electronic appliances and a selection of one or more control elements associated with the selected electronic appliance. The control element can be a setting associated with the selected electronic appliance. The selection of one or more electronic appliances and one or more control elements can be received by a hardware data receiving component within the IHMD and the selection can be generated by a controller coupled with the IHMD or IHMD system. For example, the selected electronic appliance can be an air conditioning unit and the selected control element associated with the air conditioning unit can be a temperature setting.

The IHMD system can receive a modification of at least one of the one or more control elements. The one or more control elements can be modified within the electronic appliance content of the graphical user interface. The modification can be received by a hardware receiving component within the IHMD. For example, the selected control element of a temperature setting can be adjusted to lower the temperature from a first temperature (for example 22° C.) to a second temperature (for example 20° C.).

The IHMD system can send a communication, via the hardware data transmitting component, having setting data to the selected electronic appliance. The setting data can correspond to the modification of the control element received by the IHMD system. For example, the communication can have setting data corresponding to lowering the temperature setting from the first temperature to the second temperature.

FIG. 1 illustrates an example of a system 2 in which an IHMD 100 operates. The IHMD 100 can be part of an IHMD system 10 that includes a control device 200. The control device 200 can be coupled with one or more electronic appliances 12. The one or more electronic appliances 12 can include a refrigerator 30, a smartphone 40, an air conditioner unit 20, a heater, a stove, a dishwasher, a microwave oven, a hot water heater, a washing machine, a dryer, a stove, a door entry alarm, a window alarm, and/or an oven. The one or more electronic appliances 12 can communicate one or more settings, alerts, functions, or other elements to the IHMD system 10.

In at least one instance, the refrigerator 30 can communicate the present operating settings such as fridge temperature, freezer temperature, power status. The refrigerator 30 can also communicate an operating status, for example door status, interior light status, most recent change in door or light status. In other instances, the refrigerator 30 can communicate relating to the contents of the fridge portion, the freezer portion, or a combination thereof. In other instances, the air conditioner unit 20 can communicate the current settings such as temperature, fan setting, heat, cool, and/or the present temperature setting and schedule.

The system 2 can include a controller 90 communicatively coupled with the control device 200 and the IHMD 100, thus providing input to the IHMD 100 and the control device 200. The controller 90 can generate inputs in response to alerts or communications from the one or more electronic appliances 12. The controller 90, or input device, can be a user manipulated device, such as a motion sensing controller detecting user movements as inputs. In another example, the controller 90 can be one or more retinal cameras monitoring a user's eye movements within the IHMD 100. The controller 90 can generate inputs to modify an operating parameter, status, or alert notification of the one or more electronic appliances 12. In some instances, the controller 90 can manipulate a cursor within the IHMD 100. The controller 90 can be coupled to the control device 200 or directly coupled with the IHMD 100.

The control device 200 can communicatively couple with a router 50 and termination equipment 60. The router 50 and termination equipment 60 can provide communication between the IHMD 100 and the one or more electronic appliances 12 by directing network traffic of the system 2. The router 50 and termination equipment 60 can be communicatively coupled to the control device 200 via a wired or wireless connection. While the IHMD 100 is illustrated as being coupled with the control device 200, the IHMD 100 can be self-contained, such that the performance and functionality of the control device 200 is integrally formed within the IHMD 100. Thus, the IHMD 100 can communicate directly with one or more of the devices illustrated in FIG. 1. For example, the IHMD 100 can be operable to communicate directly with the one or more electronic appliances 12. Furthermore, the IHMD 100 can be operable to communicate directly with the router 50 and the terminal equipment 60. In the illustrated example, a router 50 and terminal equipment 60 are present, however, the terminal equipment 60 can alternatively be combined into a single device that allows communication outside of a local network.

In at least one example, the control device 200 can be configured to communicate with a plurality of external devices, which includes the electronic appliances 12, air conditioner 20, refrigerator 30, smartphone 40, router 50, terminal equipment 60, lighting equipment 70, intercom equipment 80 and one or more of the above described components of the system. When the control device 200 is coupled to the terminal equipment 60, the control device 200 can receive data from one or more remote data storage devices, which can be at one or more locations on the internet. The remote data storage can include cloud storage, data centers, off-site storage, or a server within the local area network (LAN).

The system 2 can communicatively couple the IHMD system 10 with the one or more electronic appliances 12, such as a refrigerator 30. In one such instance, the refrigerator 30 can include one or more of an RFID scanner 32, a camera 34, a light 36, display screen 38, or a bar code scanner 39. The refrigerator 30 can utilize the camera 34 to provide the IHMD system 10 a real-time view of the contents within the refrigerator 30. In at least one example, the refrigerator 30 can implement product recognition technology to formulate a list of items present within the refrigerator 30. The light 36 can provide the system 2 with information relating to the on/off status of the light, such that the IHMD 100 can display the status. The light 36 can further provide information relating to the functionality and alert if the bulb requires maintenance. The display screen 38 can provide information at the refrigerator relating to contents, operating temperatures, and other functions. The display screen 38 can further allow input of information such as contents or operating settings that can be communicated to the IHMD 100. The barcode scanner 39 can allow scanning of one or more products placed in the refrigerator 30. The scanned product can be displayed on the display screen 38 or communicated to the IHMD 100.

Figure 2:
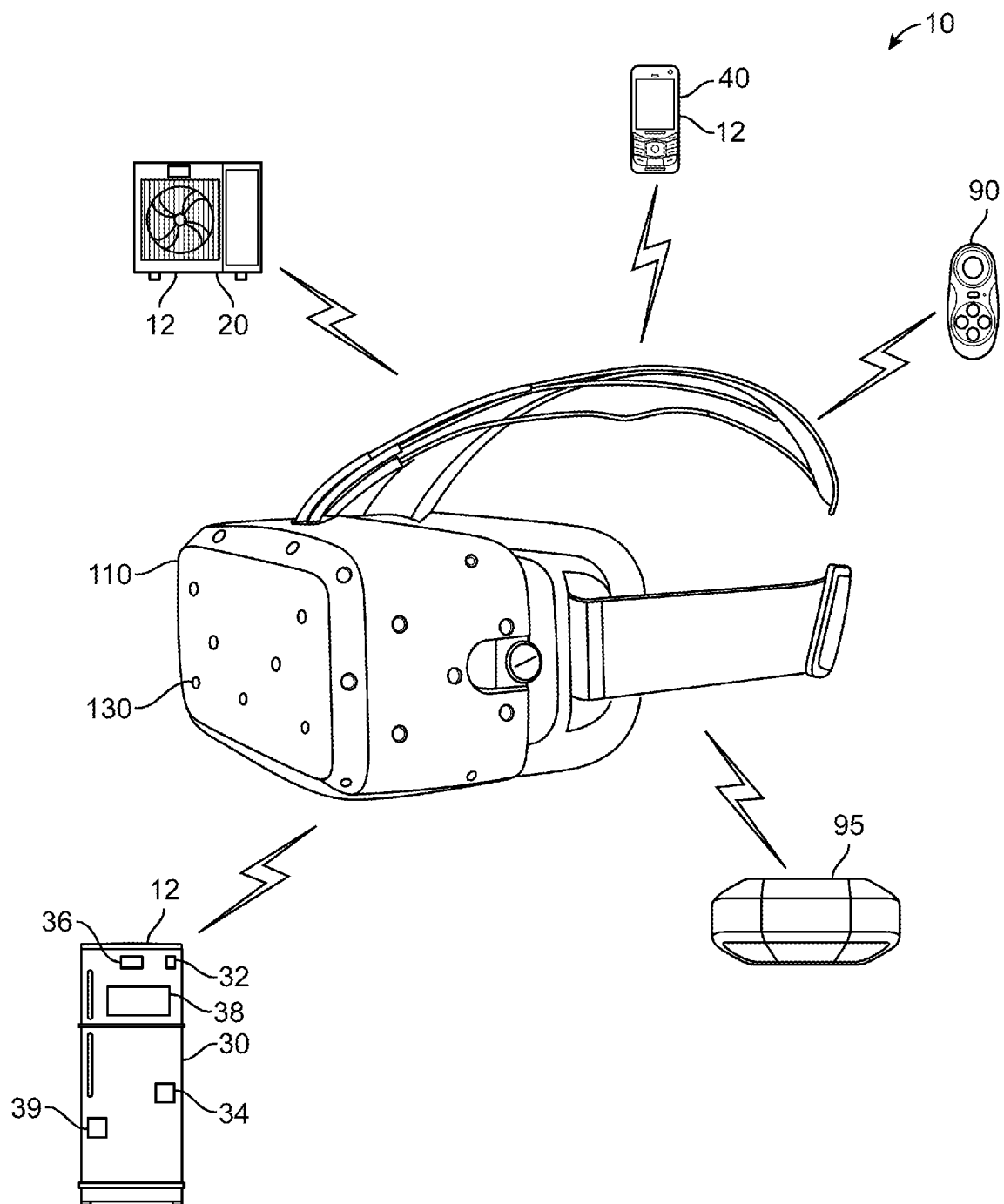
FIG. 2 illustrates an example of an IHMD system.

FIG. 2 illustrates an IHMD system 10 having an IHMD 100 communicatively coupled to one or more electronic appliances. The IHMD 100 can communicatively couple directly with a plurality of electronic appliances 12. As illustrated the IHMD 100 is directly communicatively coupled to an air conditioner 20, a smartphone 40, a controller 90, a garage door opener 95, and refrigerator 30. In some instances, the control device 200 can be integrated within the IHMD 100, thus eliminating the need for a separate control device 200.

The IHMD 100 can include one or more tracking elements 130 disposed within or on a headset 110. The tracking elements 130 can be detected by a camera to determine the position and orientation of the headset 110 relative to the camera. The tracking elements 130 can be phosphorescent elements detectable by the camera. The camera can be implemented as camera 120 shown in FIG. 1, or as any other camera coupled to the system 2.

In some instances, each of the one or more tracking elements 130 can provide a different intensity, size, shape, or wavelength of light, thus allowing the camera 120 to determine the position, orientation, and movement of the headset 110. In other instances, the tracking element 130 can be formed in distinctive patterns, thus allowing the camera 120 to determine position, orientation, and movement of the headset 110. In at least one example, the tracking elements 130 can be used to detect the movement of the headset in combination with one or more gyroscopes or accelerometers located within the IHMD 100. In another example, the tracking elements 130 can be used to calibrate the one or more gyroscopes or accelerometers located within the IHMD 100.

Figure 3:
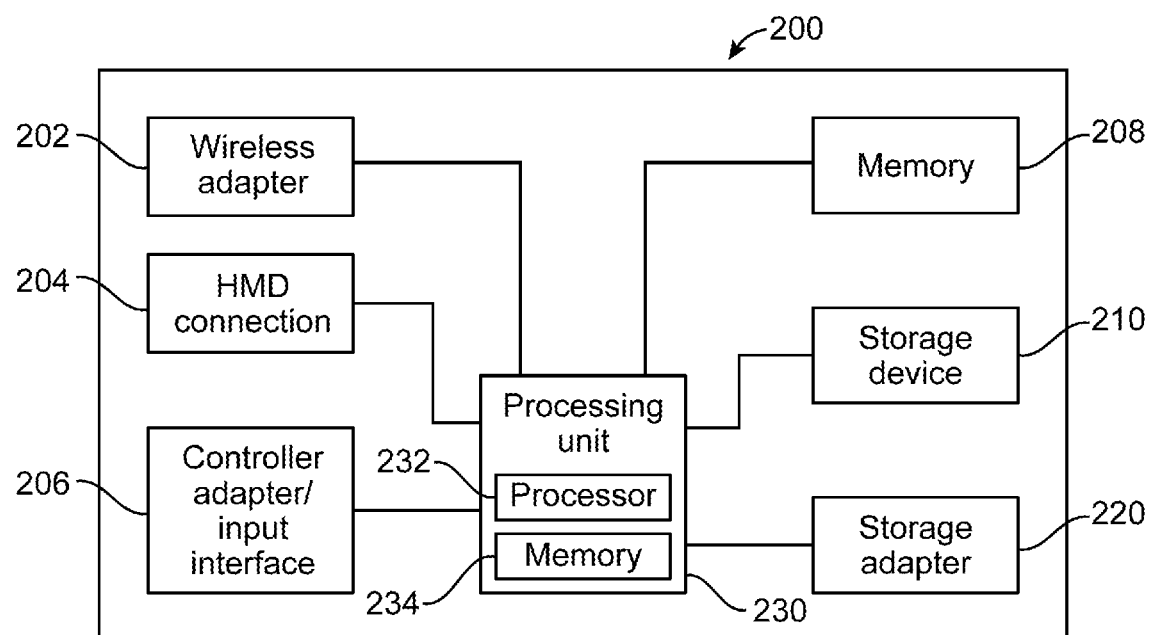
FIG. 3 illustrates an example of a block diagram of a control device.

FIG. 3 illustrates an example of a block diagram of a control device. The control device 200 can include a wireless adapter 202, an IHMD connection 204, and a controller adapter 206. The wireless adapter 202 communicatively couples the control device 200 with the router 50, termination equipment 60, and/or the electronic appliances 12. The wireless adapter 202 can communicatively couple the control device 200 via Wi-Fi, Bluetooth™, Z-Wave, cellular, or any other wireless data transfer protocol.

The IHMD connection 204 communicatively couples the control device 200 with the IHMD 100. The IHMD connection 204 allows data transfer between the control device 200 and the IHMD 100. The IHMD connection 204 can communicatively couple the IHMD 100 via a wired connection or a wireless connection, such as Wi-Fi, Bluetooth™ cellular or any other wireless data transfer protocol.

The controller adapter 206 communicatively couples the control device 200 with a controller 90 capable of receiving one or more inputs. As described above, the controller 90 can be a joystick, keypad, motion controller having one or more gyroscopes, or any other user input device.

The control device 200 can further include memory 208, such as Random Access Memory (RAM) or other temporary access memory, and one or more storage devices 210, such as a hard disk drive (HDD) for semi-permanent or permanent storage. The one or more storage devices 210 can be a HDD, a solid state drive (SSD), a combination thereof, or any other storage devices. A storage adapter 220 can be used to access the memory 208 and the one or more storage device 210.

The control device 200 can have a processing unit 230 including one or more processors 232 and memory 234. The processing unit 230 can be communicatively coupled to each of the wireless adapter 202, IHMD connector 204, controller adapter 206, memory 208, one or more storage devices 210, and storage adapter 220. The memory 234 can be cache memory, such as RAM integrated directly with the one or more processors 232.

Figure 4:
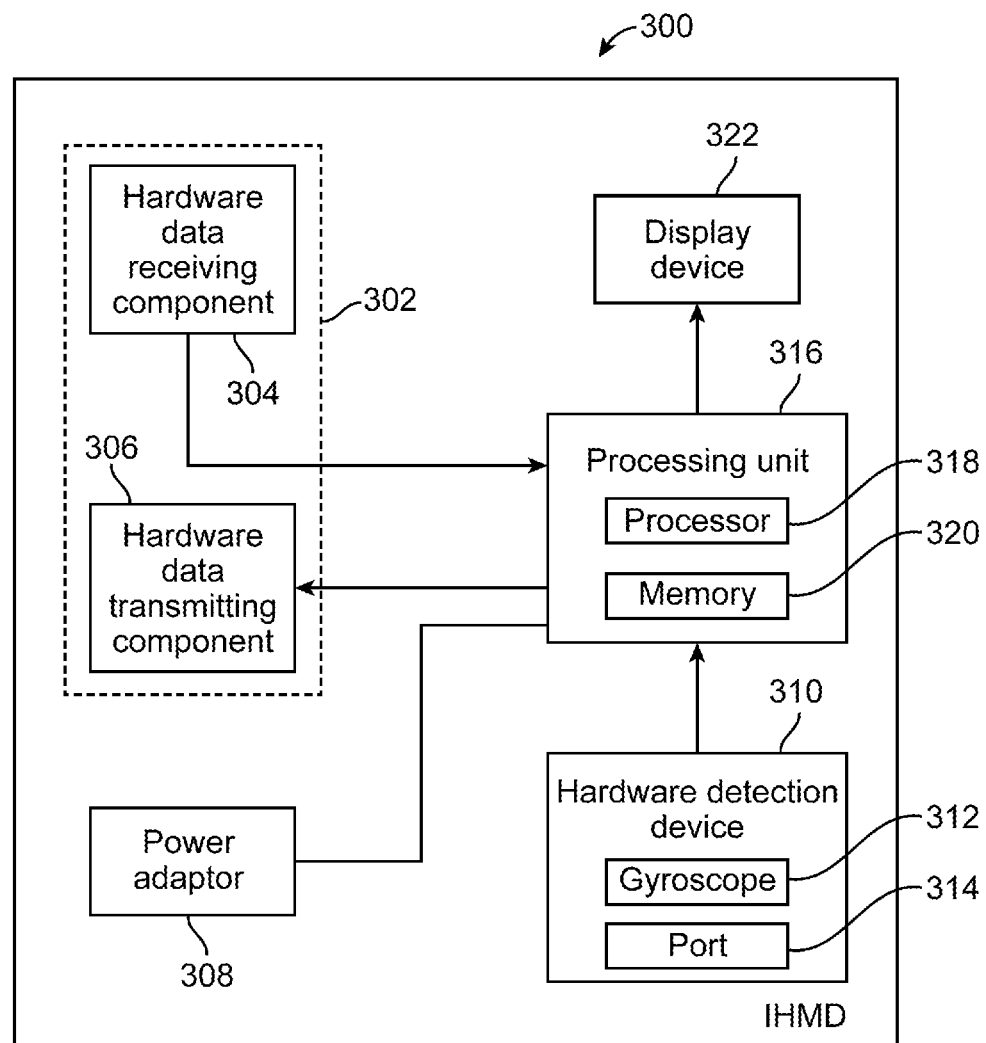
FIG. 4 illustrates an example of a block diagram of an IHMD.

FIG. 4 illustrates an example of a block diagram of an IHMD. An IHMD 300 can include a hardware data receiving component 302 having a hardware data receiving component 304 and a hardware data transmitting component 306. The hardware data receiving component 304 can be operably coupled to receive data indicative of data generated by one or more electronic appliances 12 (see FIG. 1). The hardware data transmitting component 306 can be coupled with a control device 200 to transmit setting data to the selected electronic appliance. The setting data can be data obtained from modified settings input by a user.

The IHMD 300 detailed in FIG. 4 can be substantially similar to the IHMD 100 as shown and described in FIG. 4. The IHMD 300 can have a power adapter 308 to provide electrical power to the IHMD 300 and related components. The power adapter 308 can be a re-chargeable battery, such as one or more lithium-ion cells, one or more nickel-cadmium cells, or can be a wired power source. The power adapter 308 can be coupled directly to an electrical source or can be coupled with and receive power from the control device 200. When the power adapter 308 is a re-chargeable battery, the power adapter 308 can include a charging port as well.

A hardware detection device 310 can have one or more gyroscopes 312 and one or more ports 314. The one or more gyroscope 312 can provide the IHMD 300 data relating to positioning, orientation, and/or movement of the IHMD 300. The gyroscope 312 can be a gyroscope having a single, three-axis gyroscope chip. The gyroscope 312 can be a plurality of gyroscope chips. In some instances, the IHMD 300 can have one gyroscope detecting and providing data relating to movement along a single axis, such as the X, horizontal, axis. In other instances, the IHMD 300 can have a plurality of gyroscopes detecting movement along multiple axes, such as the X, Y, and Z axes, thus allowing the hardware detection device 310 to track three dimensional movement of the IHMD 300. Each of the plurality of gyroscopes 312 can track a single axis, but collectively, the plurality of gyroscopes 312 can track movement, position, and orientation of the IHMD 300 along multiple axes. For example, a first gyroscope 312 can track movement and orientation relative to the X-axis, a second gyroscope 312 can track movement and orientation relative to the Y-axis, and a third gyroscope 312 can track movement and orientation relative to the Z-axis. While gyroscopes have been described above and illustrated, the IHMD 300 can implement accelerometers or other motion sensing detectors. The motion sensing detectors can be configured to detect motion in a given direction. In those situations where the motion sensing detectors are only able to detect motion in a single direction, the motion sensing detectors can be arranged orthogonal to one another to allow sensing in at least three different directions. In some examples, there can be nine or more motion sensing detectors.

The one or more port 314 can couple the hardware detecting device 310 with one or more external components to provide additional data and information relating to the positioning and movement of the IHMD 300. In at least one example, the hardware detecting device 310 can include both one or more gyroscopes and one or more external components. In at least one example, the one or more external components can include a camera. Additionally, IHMD can be configured to have tracking elements thereon or therein. The tracking elements can be monitored by the camera or other device configured to determine the orientation of the tracking elements. In at least one example, the one or more external components can be configured to calibrate the one or more gyroscope. As mentioned above, the present disclosure contemplates the use of other motion sensing detectors in place of the one or more gyroscope.

A processing unit 316 can have one or more processors 318 communicatively coupled to the hardware data receiving component 302. The processing unit 316 can receive data via the hardware data receiving component 304 and can transmit data via the hardware data transmitting component 306. The processing unit 316 can be communicatively coupled with the power adapter 308 and the hardware detection device 310. The hardware detection device 310 can send data relating to movement of the IHMD 300 to the processing unit 316. The processing unit 316 can include memory 320 dedicated to the one or more processors 318, such as cache memory.

A display device 322 can be coupled to the processing unit 316. The display device 322 can be operable to generate a graphical user interface featuring primary content and electronic appliance content, an example is as detailed below with respect to FIG. 5. The electronic appliance content can identify the one or more electronic appliances and provide one or more control elements associated therewith. The display device 322 can be an liquid crystal display (LCD), an light emitting diode (LED) display, or any other known display technology. In some instances, the display device 322 can include three dimensional display technology and provide a first eye with a first display, and a second eye with a second display forming the perception of depth within the combined display.

The processing unit 316 can operably modify the graphical user interface based on the selection of one or more electronic appliances. The selection of one or more electronic appliances can be received by the hardware detection device 310 in response to the graphical user interface displayed by the display device 322. The modified graphical user interface can display modifiable settings of the selected one or more electronic appliances. The processing unit 316 can update the modified graphical user interface based on the requested changes to the modifiable settings. Setting data can then be transmitted via the hardware transmitting component 314 to the control device 200. The setting data can be obtained from the modified settings.

In at least one instance, the IMHD 300 receives data generated by one or more electronic appliance and the display device 322 can generate a graphical user interface displaying the data generated by the one or more electronic appliance. The IHMD 300 and display device 322 can provide one or more control elements associated therewith. The IHMD 300 can receive a selection of one or more electronic appliances and the display device 322 can generate a graphical user interface displaying modifiable settings of the selected one or more electronic appliances. The IHMD 300 can then receive a requested change to the modifiable settings and the IHMD 300 can communicate the requested change to the one or more electronic appliance.

Figure 5:
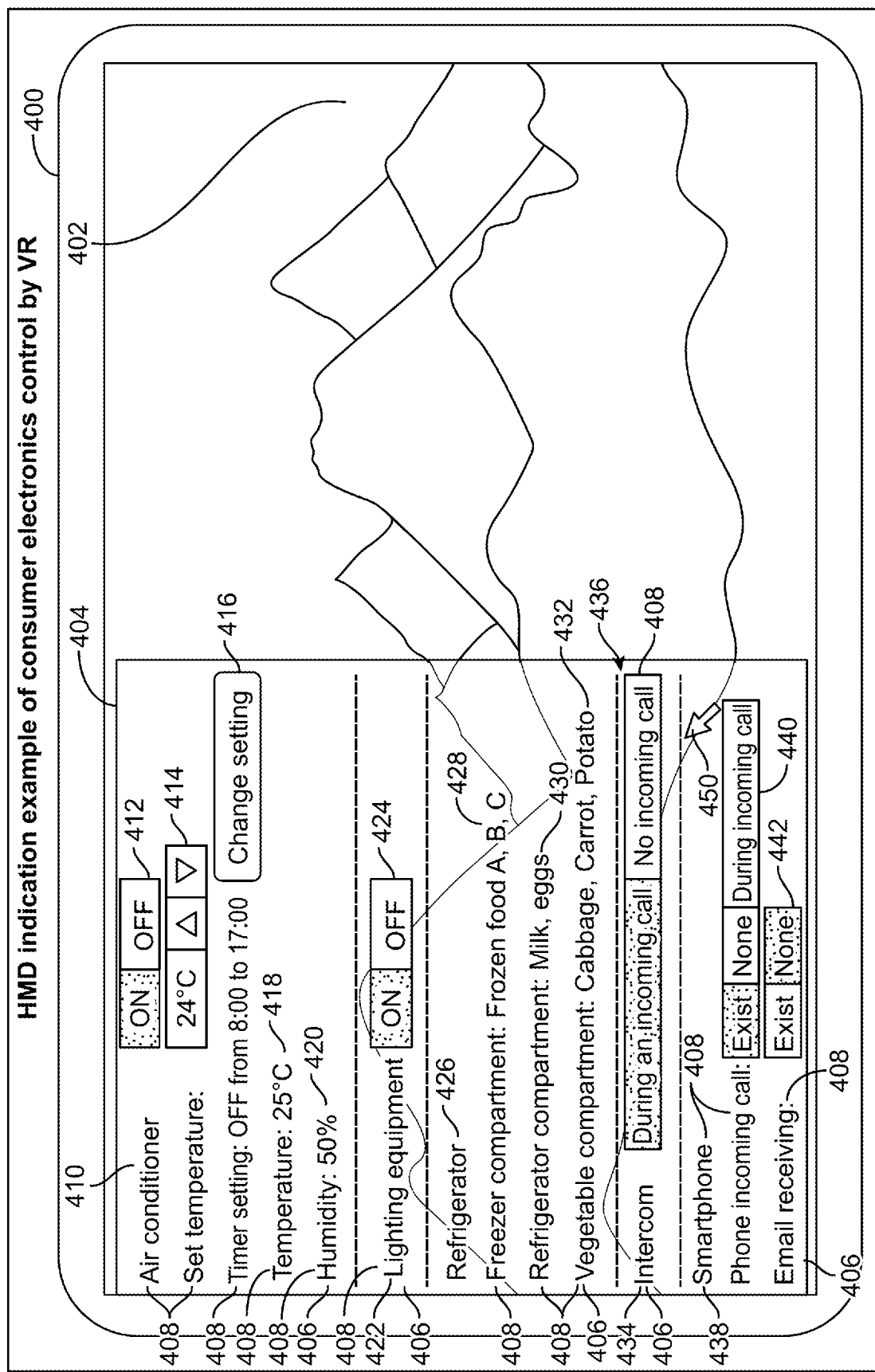
FIG. 5 illustrates a graphical user interface shown on a display of the IHMD.

FIG. 5 illustrates a graphical user interface shown on a display of the IHMD. The graphical user interface 400 can be generated by an IHMD, such as the one described above with respect to FIGS. 1 and 4. The graphical user interface 400 can have primary content 402 and electronic appliance content 404. The primary content can be one or more of a virtual reality, augmented reality, computer animation, video, movie, game, and/or any combination thereof.

The primary content 402 can be paused, stopped, or otherwise interrupted when the electronic appliance content 404 is displayed within the IHMD 300. The electronic appliance content 404 can appear as an alert to the IHMD 300, thus pausing the primary content 402 until an action is taken relating to the alert. In other instances, the primary content 402 can play in the background when the electronic appliance content 404 is displayed. An alert priority can be set to allowing pausing or interruption of the primary content 402 if the alert exceeds a certain predetermined threshold. For example, the IHMD 300 can pause or interrupt the primary content 402 and display the electronic appliance content 404 if a smartphone receives a call from a phone number within a contact list, but the primary content can remain uninterrupted if the call received is from a phone number not within the contact list.

In some instances, the electronic appliance content 404 can be watermark overlaid on the primary content 402, such that the primary content 402 is unobstructed by the electronic appliance content 404. In other instances, the electronic appliance content 404 can be overlaid on the primary content 402, such that the electronic appliance content 404 obstructs the primary content 402.

The electronic appliance content 404 can identify one or more electronic appliances 406 and provide one or more control elements 408 associated therewith. The one or more electronic appliances 406 can be one or more of a refrigerator, a smartphone, an air conditioner, a heater, a stove, a dishwasher, a microwave oven, a hot water heater, a washing machine, a dryer, a stove, a door entry alarm, a window alarm, an oven, a light control, or any other electronic appliance.

The electronic appliance content 404 can be changed or modified using a virtual reality controller 450 operated by a controller as described above with respect to FIG. 1. The controller can allow manipulation of the one or more control elements 408 to view, modify, or change the control elements 408 within the electronic appliance content. The virtual reality controller 450 can allow interaction and manipulation of the electronic appliance content 404 within the IHMD 300.

The electronic appliance content 404 can be displayed after receiving a command from the IHMD 300 or control device 200. In some instances, the electronic appliance content 404 can be dynamically displayed upon receiving an alert from the one or more electronic appliances 406. The electronic appliance content 404 can be overlaid on the primary content 402 upon receiving an alert. In other instances, the electronic appliance content 404 can be statically displayed upon a command received by the IHMD 300 and/or control device 200.

The electronic appliance content 404 can display information related to an air conditioner 410 and at least one of power status 412, a temperature setting 414, a timer setting 416, current temperature 418, and current humidity 420. The information related to the air conditioner 410 can provide interactive options and non-interactive options. In some instances, the power status 412 can provide an interactive toggle switch between an on/off allowing the operating status 412 to be adjusted. The interactive toggle can include a higher temperature graphic in a form of an upward pointing arrow and a lower temperature graphic in the form of a downward pointing arrow. In other instances, the operating status can be a non-interactive such that the operating status 412 is displayed, but cannot be adjusted. Similarly, each of the temperature setting 414, timer setting 416, current temperature 418, and current humidity 420 can be displayed as interactive options and/or non-interactive options.

The selection of a higher temperature graphic can cause the displayed temperature setting 414 to be increased and cause the transmission of setting data to the air conditioner to adjust the temperature of the air conditioner, accordingly. Selection of a lower temperature graphic can cause the displayed temperature to be decreased and cause the transmission of setting data to the air conditioner to adjust the temperature of the air conditioner, accordingly. Additionally, the present disclosure contemplates interacting between the menus shown such as the temperature setting 414 in a manner similar to the discussion below with respect to FIGS. 7A-7G.

In other instances, the temperature setting 414 can be selectable and upon selection of the temperature microphone data, obtained from a microphone communicatively coupled with the IHMD 300 or the control device 200. The microphone data can be a spoken new temperature and setting data is transmitted to the air conditioner to adjust the temperature accordingly.

The electronic appliance content 404 can display information related to lighting equipment 422 and a toggle switch 424 adjusting the operating settings of the lighting equipment. The toggle switch 424 can adjust the lighting equipment between an on operating setting and an off operating setting within the graphical user interface 400.

The electronic appliance content 404 can display information relating to a refrigerator 426 including freezer compartment 428, refrigerator compartment 430, and/or vegetable compartment 432. In some instances, the refrigerator 426 can also provide information relating to power status, temperature setting, current temperature, last time the refrigerator was open, interior light status, such as on or off, and door status, such as open or close.

The refrigerator 426 can provide information relating to the freezer compartment 428, for example contents of frozen vegetables ("A"), ice ("B"), and ice cream ("C"). Similarly, the refrigerator 426 can provide information relating to the contents of refrigerator compartment 430, such as milk and eggs, and information relating to the contents of the vegetable compartment 432. For example, the IHMD 300 can include information from the refrigerator 426 indicating the vegetable compartment 432 presently contains cabbage, carrots, and potatoes. In some instances, the information relating to the freezer compartment 428, refrigerator compartment 430, and vegetable compartment 432 can be non-interactive, static displays. The non-interactive, static displays provide information within the IHMD 300, but cannot be modified or changed using a controller 90. The dynamic displays provided within the IHMD 300 can contain information that can be modified or changed using the IHMD 300 and controller 90.

As described above with respect to the air conditioner 410, the refrigerator can similarly have interactive and non-interactive options. More specifically, the refrigerator can have an interactive selectable graphic to adjust the temperature of the freezer compartment, refrigerator compartment, vegetable compartment, or any combination of compartments within the refrigerator 426. The selectable graphic can include a higher temperature graphic in a form of an upward pointing arrow and a lower temperature graphic in the form of a downward pointing arrow. The selection of a higher temperature graphic can cause the temperature setting 414 to be increased and cause the transmission of setting data to the refrigerator to adjust the temperature of the respective refrigerator compartment, accordingly. Selection of a lower temperature graphic can cause the displayed temperature to be decreased and cause the transmission of setting data to the air conditioner to adjust the temperature of the respective refrigerator compartment accordingly.

The electronic appliance content 404 can further include information relating to an intercom 434. The information relating to the intercom 434 can have one or more toggle switch 436. Information relating to a smartphone 438 can similarly have one or more toggle switches 440, 442 relating to phone calls and emails, respectively.

FIG. 5 provides an example of the interactivity and alert data interactivity, the present disclosure includes different arrangements that are beyond what is described in FIG. 5 based on the totality of the remainder of the disclosure. The interactivity and alert data interactivity can be displayed and arranged beyond what is shown and described above in FIG. 5. The electronic appliance content 404 can be displayed on the left edge, right edge, bottom edge, top edge, or overlaid on the entire display. Additionally, the electronic appliance content 404 can provide content to a plurality of electronic appliances at a time (as shown), or provide content to only a single electronic appliance at a given time and allow a user to scroll through individual electronic appliances.

Figure 6A:
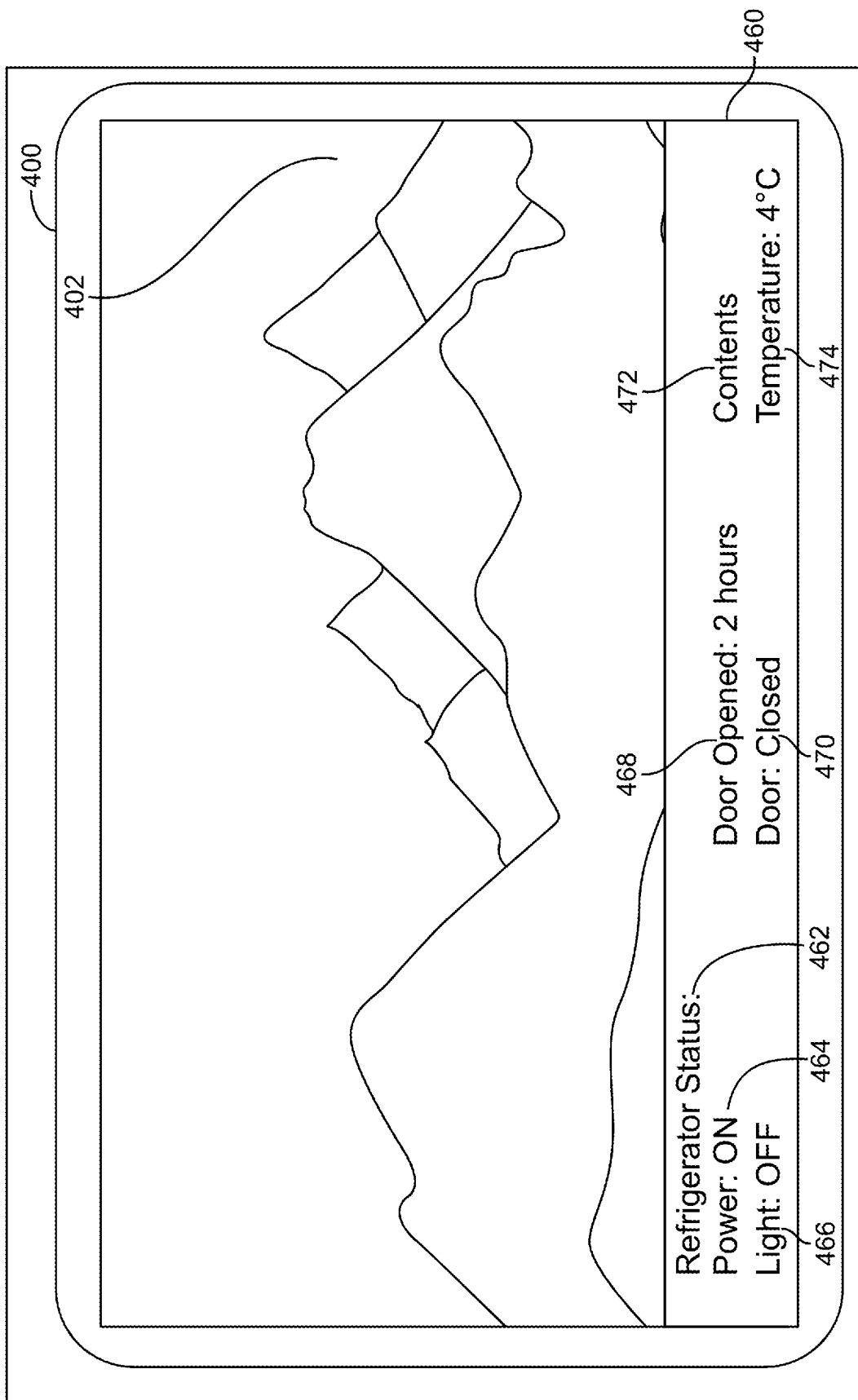
FIG. 6A illustrates a graphical user interface shown on a display of the IHMD having an electronic appliance content display.

FIG. 6A illustrates a graphical user interface of an IHMD. The graphical user interface 400 can have primary content 402 and electronic appliance content 404. The electronic appliance content 404 can be overlaid over a bottom portion of the primary content 402. The electronic appliance content 404 can provide alert information 460 relating to one or more settings or control elements of the selected electronic appliance. For example, a refrigerator status 462 can overlay at least a portion of the primary content 402 and provide information relating to one or more of a power status 464, a light status 466, a door opened status 468, a door status 470, contents status 472, and a temperature status 474.

The power status 464 can indicate whether the refrigerator 462 is on or off, and in some instances provide the ability to alter the power status. The light status 466 can indicate whether the lighting system within the refrigerator 462 is on or off, and in some instances can indicate if one or more of the lighting elements needs to be replaced. The door opened status 468 can indicate the amount of time between the present time and the most recent door open event. The door open status 468 can indicate the refrigerator 462 was most recently opened, for example 2 hours ago, or any other amount of time that the door was opened. The door status 470 can indicate the present state of the refrigerator door. In some instances, the door status 470 can indicate the refrigerator 462 was not properly closed and the door remains open. The contents status 472 can provide information relating to the current contents of the refrigerator 472. In some instances, the contents can be determined by one or more cameras within the refrigerator 462 as described above with respect to FIG. 1. The temperature status 474 can provide information relating to the present temperature of the refrigerator 462, and in some instances allow modification of the temperature setting to lower the temperature or increase the temperature setting 474.

Figure 6B:
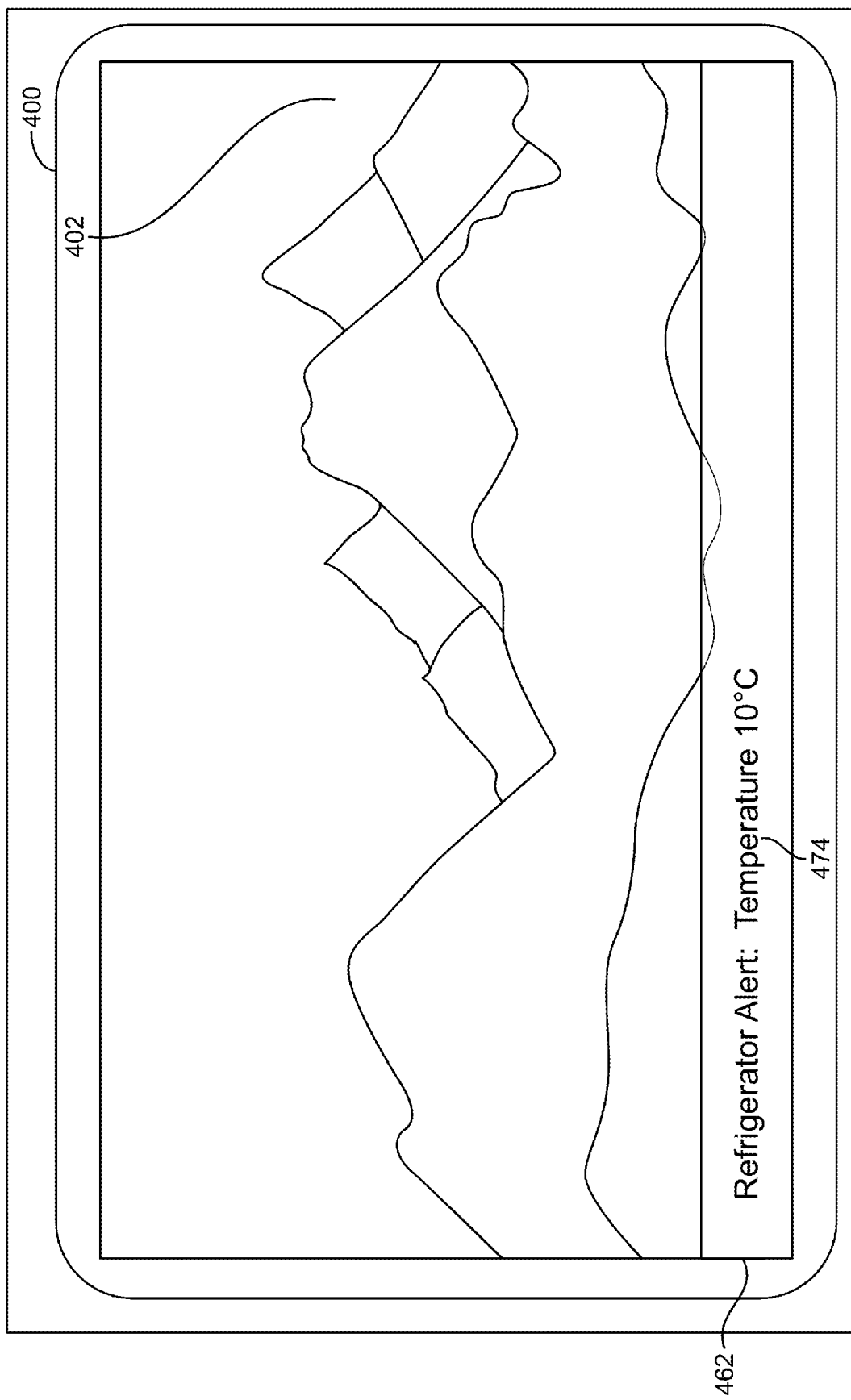
FIG. 6B illustrates a graphical user interface shown on display of the IHMD having an alert notification.

FIG. 6B illustrates a graphical user interface of an IHMD having an alert status. The graphical user interface 400 displayed within the IHMD 300 can have primary content 402 and alert information 460. The alert information 460 can indicate a refrigerator 462 having a temperature status 474 that exceeds a predetermined setting. The predetermined setting can be a specific temperature, or a temperature range, and the refrigerator 462 can generate an alert 462 to be displayed within the graphical user interface 400 when the temperature differs from the predetermined setting. For example, the predetermined temperature setting can be 4° C. as illustrated in FIG. 6A, but the graphical user interface 400 can provide an alert 462 indicating the temperature status 474 within the refrigerator 462 exceeds the setting.

While the illustrated example in FIG. 6B is drawn to a refrigerator, the alert information 460 can be received by and pertain to any one or more of the electronic appliances 12 coupled with the system 2.

Figure 6C:
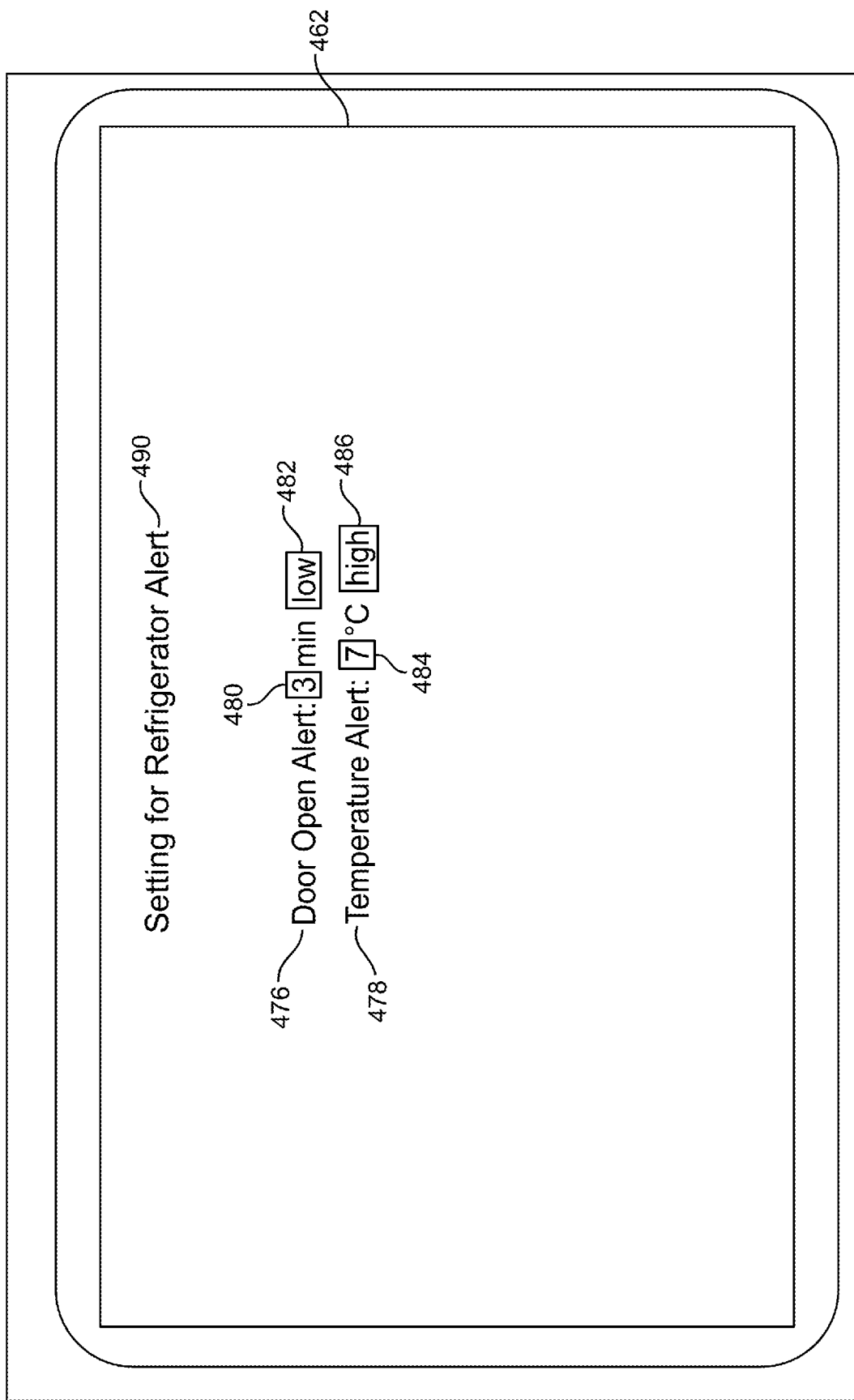
FIG. 6C illustrates setting data of an electronic appliance content display.

FIG. 6C illustrates example setting data of an IHMD system. The graphical user interface 400 can display modifiable settings 490 of the refrigerator 462. The modifiable settings can include a door open alert 476 and a temperature alert 478. The door alert 476 can provide information relating to how long the refrigerator door has been open. The door alert 476 can have a modifiable setting for a predetermined time 480 and a priority 482. The predetermined time 480 can allow a setting of how many minutes the door can be ajar before an alert is generated. For example, the predetermined time 480 can be set to "3 minutes" and if the door is open for more than 3 minutes, an alert will be generated. The priority 482 allows a setting to determine the priority of the alert generated, for example "high," "medium," or "low." The priority 482 can determine whether the alert interrupts the primary content 402 of the graphical user interface 400. In at least one instance, a priority 482 setting of "high" will interrupt and pause the primary content 402 to display the alert, a priority setting 482 of "medium" will display the alert content overlaid on the primary content 402 without interrupting or pausing, and a priority 482 of "low" will display an alert icon or other notification indicating an alert exists, without otherwise obscuring the primary content 402.

For example, the temperature alert 478 can be set to a predetermined temperature 484 and a "high" alert status 486 indicating the primary content 402 should be interrupted and paused should the refrigerator determine the temperature deviates from the predetermined temperature 484.

The setting data for the refrigerator 490 can be modified from the IHMD 300 to alter the alert priority or modify the predetermined time 480 of door alert status 476 or the predetermined temperature 484 of the temperature alert 478. The IHMD 300 communicate the modifications to the selected electronic appliance.

Figure 7A:
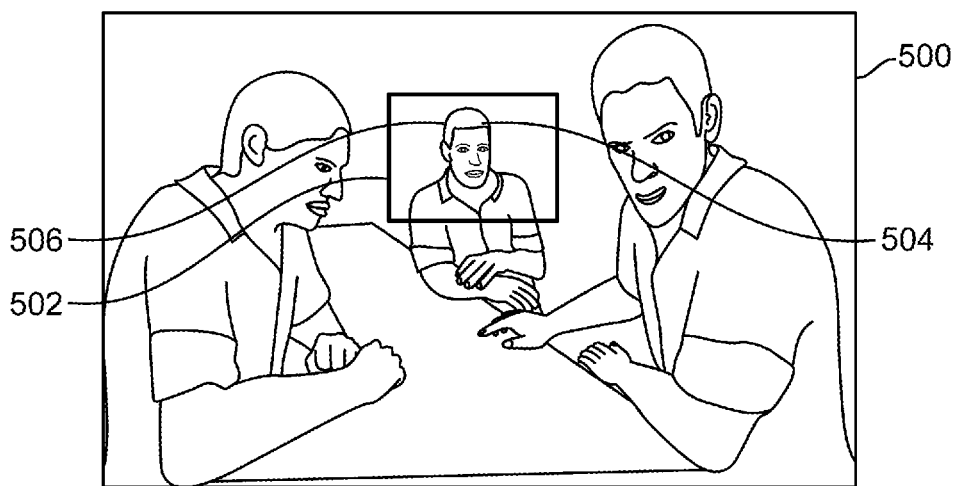
FIG. 7A illustrates a graphical user interface of an IHMD.

FIG. 7A illustrates a graphical user interface of an IHMD. The graphical user interface 500 can have a graphic field of view 502 generated using at least a portion of graphical data received by the IHMD. The IHMD can be an IHMD 300 as described above with respect to FIG. 4. The graphical field of view can be modified based on data received from one or more gyroscope 312 coupled with the IHMD 300. The modified graphical field of view can allow the graphical user interface to vary in response to movement, position, and/or orientation of the IHMD 300.

The processing unit 316 can receive an input from an input interface directed toward the specific target 504. In some instances, the input interface is operable to be communicatively coupled to the processing unit 316 and configured to detect spoken questions or commands. In other instances, the input can be motion of the IHMD 300 in a specific direction or orientation to be detected by the one or more gyroscopes 312.

The processing unit 316 of the IHMD 300 can identify a specific target 504 from one or more potential targets within the graphical field of view 502. The specific target 504 can alternatively be identified within the modified graphical field of view. The identification of the specific target 504 can include determining interaction objections 506 located within the graphical field of view 502. The processing unit 316 can select one or more interaction objects 506 displayed within a central region or a majority of the graphical field of view 502. In some instances, the one or more interaction objects 506 can be a person, a robot, an animal, a computer, or a kiosk.

The processing unit 316 can be operable to generate response data based on the received input by interface, such as a spoken question or command. The response data can be audio data, such as a spoke response, or a graphical textual data, such as a display written response. The response data can be selection from a predetermined group of response data or the response data can generate new graphical data used to generate the graphical user interface 500.

Figure 7B:
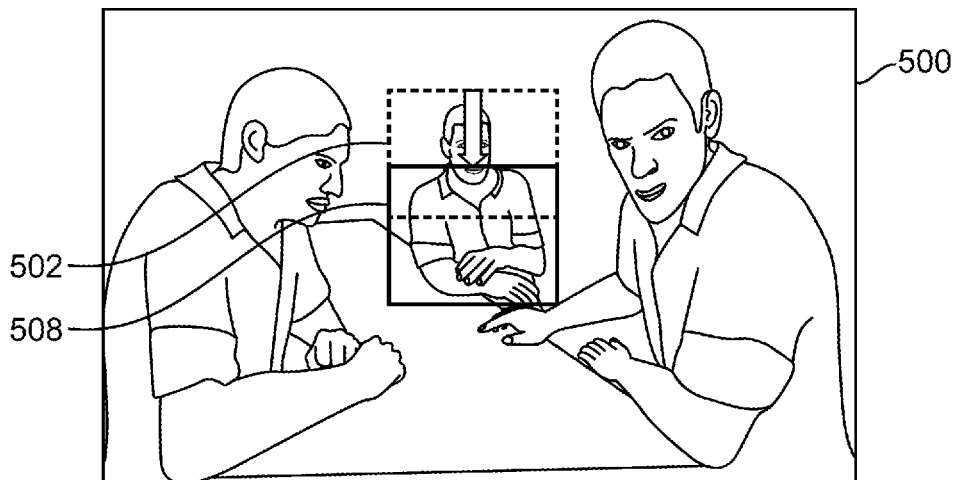
FIG. 7B illustrates a graphical user interface of an IHMD having a downwardly modified graphical field of view.

FIG. 7B illustrates a graphical user interface of an IHMD with a modified graphical field of view. Movement of the IHMD 300 can generate a modified graphical field of view 508. The modified graphical field of view 508 can generated as an input to the specific target 504. In some instances, the modified graphical field of view 508 can be movement of the IHMD 300 in an up or down direction generated as an input or response to the specific target 504 or interaction object 506.

Figure 7C:
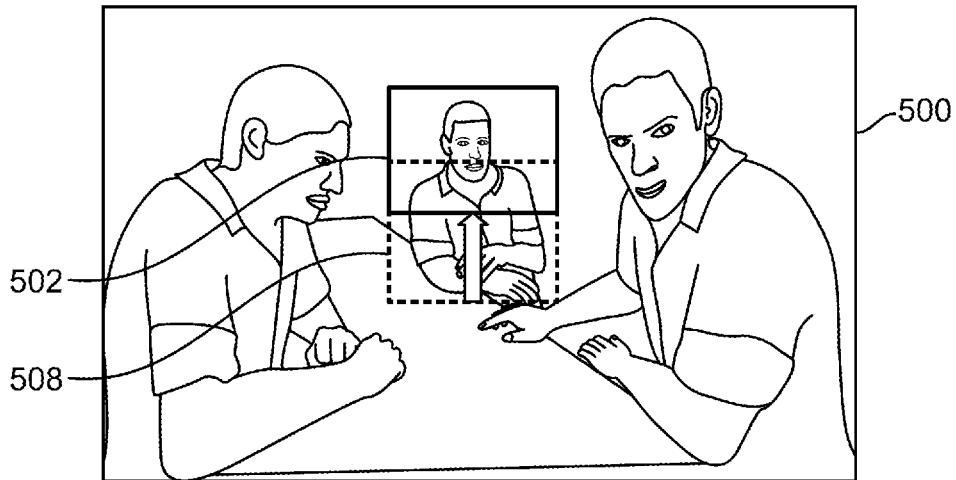
FIG. 7C illustrates a graphical user interface of an IHMD having a graphical field of view.

FIG. 7C illustrates a graphical user interface of an IHMD returning to the graphical field of view. The graphical field of view 502 can return to the portion of the graphical user interface 500 after the input or response to the specific target 504 is generated.

FIGS. 7A-7C can illustrate an IHMD input of a "yes" command in view of response data generated by the processing unit 316. For example, the response data can be posed in the form of a question requiring an IHMD input. Movement of the IHMD 300 in a vertical, up and down, motion can be detected by the one or more gyroscopes 312 as a response corresponding to "yes" or affirmative answer. The processing unit can transmit a downward shifted graphical field of view and an upward shifted graphical field of view in response to a head shake movement in the downward and upward direction. In some instances, the affirmative, or "yes" command, can be made by moving the upward and then downward. The movement of the IHMD 300 can be further detected by one or more of the motion sensing devices as described above including but not limited to a camera, tracking elements, and accelerometers.

Figure 7D:
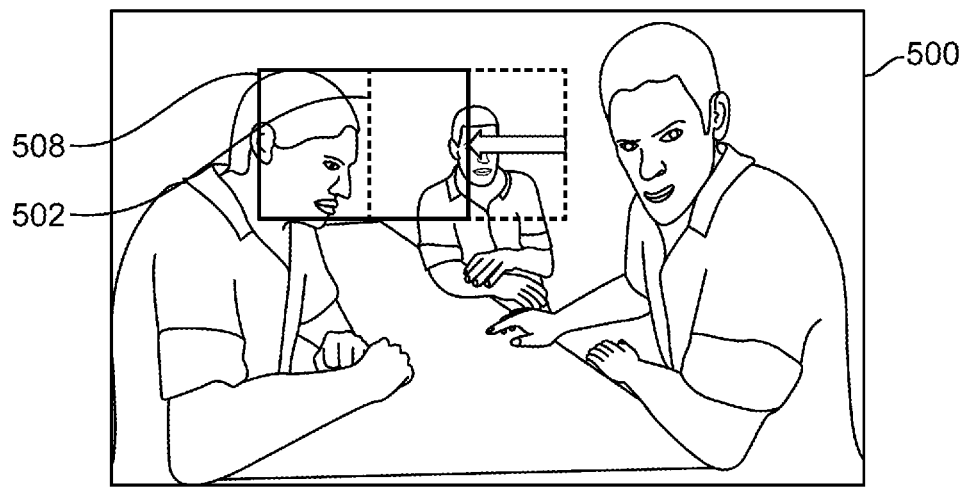
FIG. 7D illustrates a graphical user interface of an IHMD having a leftward modified graphical field of view.
Figure 7E:
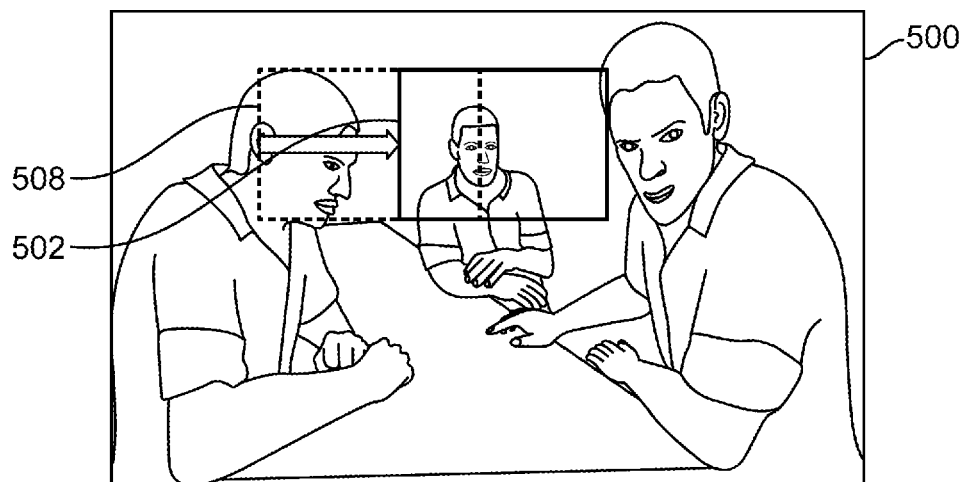
FIG. 7E illustrates a graphical user interface of an IHMD having graphical field of view.
Figure 7F:
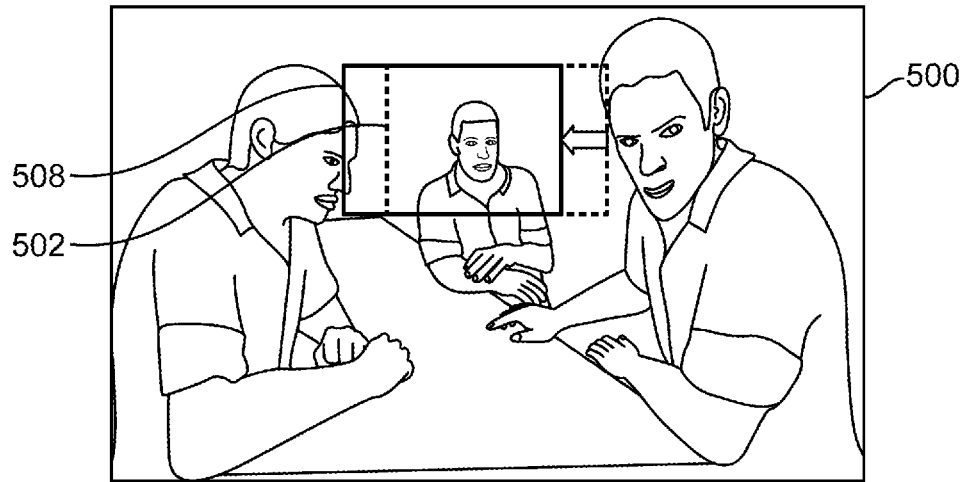
FIG. 7F illustrates a graphical user interface of an IHMD having a partially leftward modified graphical view of view.

While a vertical, up and down, movement of the graphical field of view is illustrated as the input or response, it is within the scope of this disclosure that the movement of the graphical field of view can be in a horizontal direction, left to right. FIGS. 7D-7F can collectively illustrate an IHMD input of a "no" or negative command in view of response data generated by the processing unit 316. For example, the response data can be posed in the form of a question requiring an IHMD input. Movement of the IHMD 300 in a horizontal, left and right, motion can be detected by the one or more gyroscopes 312 as a response corresponding to "no" or negative answer. The movement data can indicate a headshake in a left and right direction. The processing unit can transmit a leftward shift in graphical field of view and a rightward shift in graphical field of view in response to a head shake in the leftward and rightward direction. In some instances, the head shake can begin by moving rightward and then leftward.

Figure 7G:
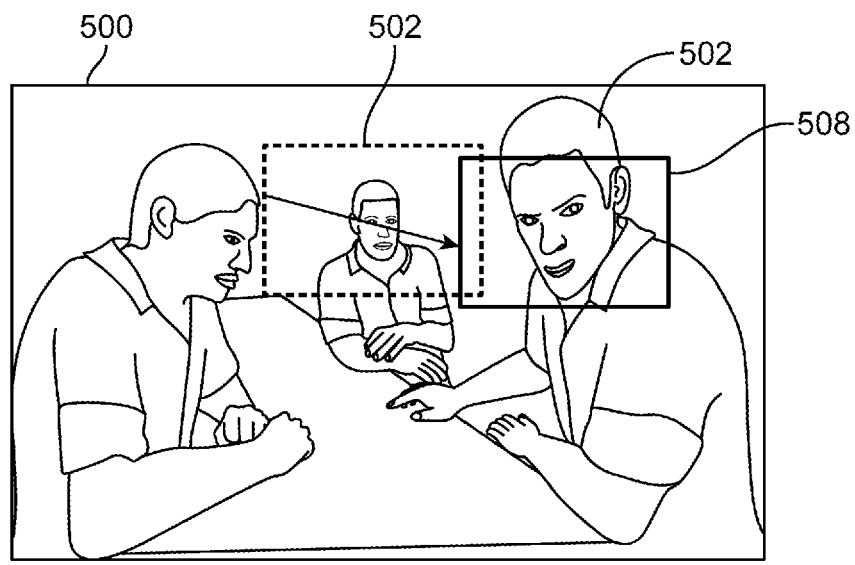
FIG. 7G illustrates a graphical user interface of an IHMD having a modified graphical field of view.

FIG. 7G illustrates a graphical user interface of an IHMD acquiring a new target. The graphical user interface 500 can provide multiple specific targets 506, including one or more specific targets beyond the graphical field of view 502. The graphical field of view 502 can be modified to seek and/or acquire a new specific target 510. The graphical field of view 502 can be modified through movement of the IHMD 300 or input through a controller. The movement data can indicate movement in a measured direction away from the graphical field of view, such that varying graphical field views are displayed until a designated target is displayed within one of the varying graphical field of views and when motion of the IHMD is stationary got more than a predetermined amount of time.

As can be appreciated in FIG. 7G, the graphical field of view 502 is moved right within the graphical user interface 500 and acquires a new specific target 510. The new specific target 510 can then elicit an input or response from the processing unit 316.

Figure 8:
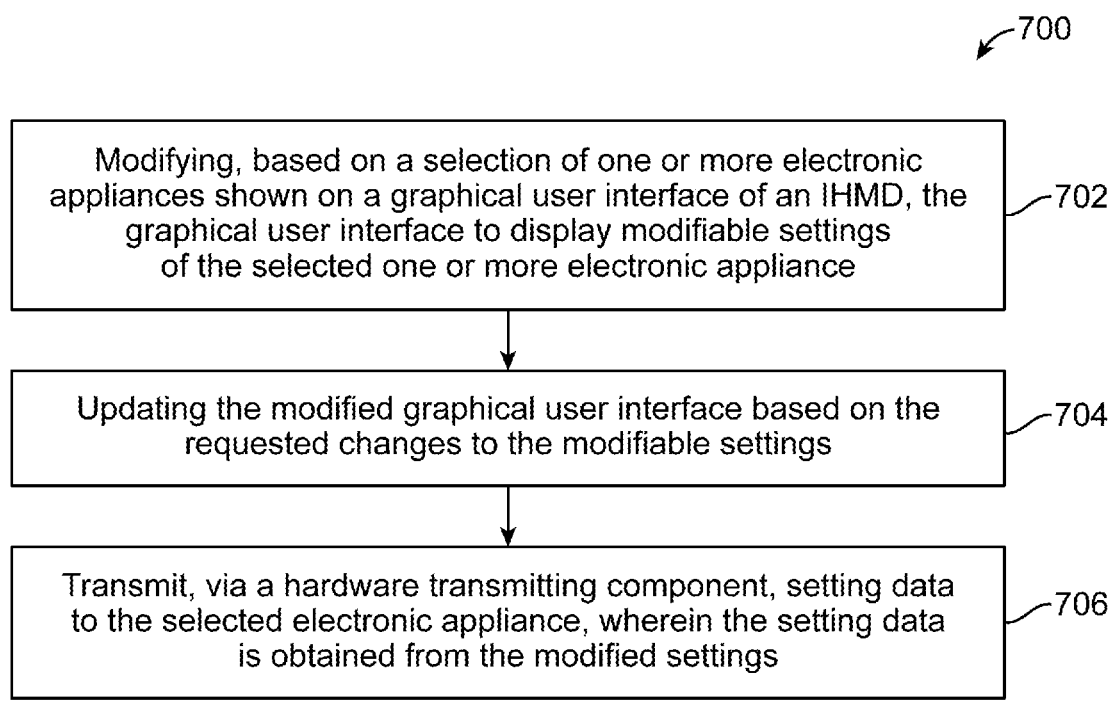
FIG. 8 illustrates a flowchart of an example method implementing an IHMD.

FIG. 8 illustrates a flowchart of an IHMD system. An IHMD system method 700 can utilize the elements as described above and implemented collectively to form the system 2. The IHMD system method 700 can include additional blocks and the arrangement of the blocks as presented is not intended to be presented as a particular order, as they blocks can be performed in numerous orders. The IHMD system method 700 can be begin at block 702.

At block 702, a graphical user interface of an IHMD of an IHMD system can be modified based on the selection of one or more electronic appliances. The graphical user interface can display modifiable settings of the selected one or more electronic appliances.

At block 704, the IHMD update the modified graphical user interface based on the requested changes to the modifiable settings.

At block 706, the IHMD system can transmit, via hardware transmitting component, setting data to the selected electronic appliance. The setting data can be obtained from the modified settings and provide the selected electronic appliance within instructions to modify a respective setting.

The invention claimed is:

1. An immersive head-mounted display (IHMD) comprising:
   a hardware data receiving component operable to receive data indicative of data generated by one or more electronic appliances;
   a processing unit having one or more hardware processors communicatively coupled to the hardware data receiving component; and
   a display device coupled to the processing unit, the display device operable to generate a graphical user interface featuring primary content and electronic appliance content, wherein the electronic appliance content identifies the one or more electronic appliances and provides one or more control elements associated therewith;
   the processing unit further operative to:
      modify, based on a first selection of a representation of a refrigerator, the graphical user interface to display the one or more control elements associated with the refrigerator, the one or more control elements associated with the refrigerator including a first control element to pause rendering of the primary content and to display a real-time view of contents of the refrigerator; and in response to receiving a second selection of the first control element, pause the rendering of the primary content and display the real-time view of contents of the refrigerator.

2. The IHMD as recited in claim 1, wherein the one or more electronic appliances further include one or more of a smartphone, an air conditioner unit, a heater, a stove, a dishwasher, a microwave oven, a hot water heater, a washing machine, a dryer, a stove, a door entry alarm, a window alarm, or an oven.

3. The IHMD as recited in claim 1, wherein the one or more control elements associated with the refrigerator include graphical user interface information related to at least one of a temperature of the refrigerator, a power status, a last time the refrigerator was opened, an interior light status, or a door status.

4. The IHMD as recited in claim 3, wherein the graphical user interface information related to the temperature of the refrigerator includes selectable graphics that allow a temperature of the refrigerator to be adjusted, wherein upon selection of a higher temperature graphic causes a displayed temperature to be increased and causes transmission of setting data to the refrigerator to adjust the temperature of the refrigerator, accordingly.

5. The IHMD as recited in claim 4, wherein selection of a lower temperature graphic causes the displayed temperature to be decreased and causes transmission of setting data to the refrigerator to adjust the temperature of the refrigerator, accordingly.

6. The IHMD as recited in claim 5, wherein the higher temperature graphic is in a form of an upward pointing arrow and the lower temperature graphic is in a form of a downward pointing arrow.

7. The IHMD as recited in claim 4, wherein the temperature is selectable and upon selection of the temperature, microphone data, obtained from a microphone communicatively coupled to a control device, is processed by the processing unit to determine if a new temperature is spoken into the microphone and the temperature is updated to reflect the spoken new temperature and setting data is transmitted to the refrigerator to adjust the temperature of the refrigerator, accordingly.

8. The IHMD as recited in claim 4, wherein the temperature is flashing if the temperature of the refrigerator is outside of acceptable limits.

9. The IHMD as recited in claim 1, wherein the hardware data receiving component receives the data indicative of data generated by the one or more electronic appliances from a control device that is operable to communicate with the one or more electronic appliances; and a hardware transmitting component transmits the second selection of the first control element to the control device.

10. The IHMD as recited in claim 1, wherein the hardware data receiving component receives the data indicative of data generated by the one or more electronic appliances directly from the one or more electronic appliances; and a hardware transmitting component transmits the second selection of the first control element directly to the refrigerator.

11. The IHMD as recited by claim 1, wherein the refrigerator includes a camera and an interior light, wherein the one or more control elements associated with the refrigerator further include one or more second control elements to turn the interior light on or off, and wherein receiving the second selection of the first control element further turns the interior light on and activates the camera to capture the real-time view of the contents of the refrigerator.

12. The IHMD as recited by claim 1, wherein the real-time view includes a textual list of the contents of the refrigerator.

13. A method comprising:

generating, on a display device of an immersive head-mounted display (IHMD), a graphical user interface featuring primary content and electronic appliance content, wherein the electronic appliance content identifies one or more electronic appliances and provides one or more control elements associated therewith;

modifying, based on a first selection of a representation of a first electronic appliance shown on the graphical user interface, the graphical user interface to display modifiable settings of the first electronic appliance, the modifiable settings including an alert priority that allows alert data associated with the first electronic appliance to pause rendering of the primary content and the alert data to be presented when an identifier of the first electronic appliance is included in a contact list, the alert data including a request to establish a telecommunication session between the IHMD and the first electronic appliance or to ignore the request;

updating the graphical user interface based on requested changes to the modifiable settings, the requested changes including a second selection of the alert priority;

transmit, via a hardware transmitting component, setting data to the first electronic appliance, wherein the setting data is data obtained from the requested changes to the modifiable settings; and in response to receiving first alert data associated with the first electronic appliance, pausing the rendering of the primary content and presenting the first alert data when the identifier of the first electronic appliance is included in the contact list.

14. An immersive head-mounted display (IHMD), comprising:

one or more displays;

one or more processors; and memory including instructions that, when executed by the one or more processors, cause the IHMD to:

present primary content on the one or more displays;

receive alert data from an electronic appliance;

determine an alarm level of the alert data, wherein the alarm level is high when the electronic appliance is associated with an identifier included within a contact list, and the alarm level is low when the identifier is not included within the contact list; and in response to a determination that the alarm level is high, present one or more user interface elements to answer a request to establish a telecommunication session between the IHMD and the electronic appliance or to ignore the request.

15. The IHMD of claim 14, further comprising further instructions that, when executed by the one or more processors, further cause the IHMD to:

in response to a determination that the alarm level is low, ignore the alert data.

16. The IHMD of claim 14, wherein the electronic appliance is a smartphone and the identifier is a phone number.

17. The IHMD of claim 14, wherein the electronic appliance is one of a refrigerator, an air conditioner unit, a heater, a stove, a dishwasher, a microwave oven, a hot water heater, a washing machine, a dryer, a stove, a door entry alarm, a window alarm, or an oven.

18. The IHMD of claim 14, further comprising a microphone and further instructions that, when executed by the one or more processors, further cause the IHMD to:
  receive an input from the microphone to answer the request or to ignore the request.

19. The IHMD of claim 14, further comprising a motion sensor and further instructions that, when executed by the one or more processors, further cause the IHMD to:
  receive an input from the motion sensor to answer the request or to ignore the request.

20. The IHMD of claim 14, further comprising a physical interface operable to block substantially all light external to the IHMD from a field of view of a user when the user mounts the IHMD.

* * * * *